(12) United States Patent
Park

(10) Patent No.: US 9,598,568 B2
(45) Date of Patent: Mar. 21, 2017

(54) RUBBER COMPOSITION FOR WEATHER STRIP GLASS RUN CHANNEL

(71) Applicant: HYUNDAI MOTOR COMPANY, Seoul (KR)

(72) Inventor: Joon Chul Park, Daegu (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/872,111

(22) Filed: Sep. 30, 2015

(65) Prior Publication Data

US 2016/0160018 A1 Jun. 9, 2016

(30) Foreign Application Priority Data

Dec. 5, 2014 (KR) ........................ 10-2014-0173923

(51) Int. Cl.
*C08L 23/16* (2006.01)
*C08J 3/22* (2006.01)
*C08J 3/00* (2006.01)

(52) U.S. Cl.
CPC .............. *C08L 23/16* (2013.01); *C08J 3/005* (2013.01); *C08J 3/226* (2013.01); *C08J 2323/16* (2013.01); *C08J 2451/08* (2013.01)

(58) Field of Classification Search
CPC ............. C08L 23/16; C08J 3/226; C08K 3/04
USPC ........................... 523/351; 524/433, 496, 504
See application file for complete search history.

(56) References Cited

FOREIGN PATENT DOCUMENTS

| JP | 08-020683 A | 1/1996 |
|---|---|---|
| JP | 2002-256095 A | 9/2002 |
| KR | 10-2004-0047803 A | 6/2004 |
| KR | 2009-0066022 A | 6/2009 |
| KR | 10-2010-0119980 A | 11/2010 |
| KR | 10-1037383 B1 | 5/2011 |
| KR | 10-2012-0113295 A | 10/2012 |
| WO | 2007/025663 A1 | 3/2007 |

OTHER PUBLICATIONS

JPH0820683 machine translation of original document dated 1996.*
Park, K.; "EPDM Compound Having Excellent Sliding Resistance"; Autumn scientic meeting; Nov 6-7, 2014.

* cited by examiner

*Primary Examiner* — Edward Cain
(74) *Attorney, Agent, or Firm* — McDermott Will & Emery LLP

(57) ABSTRACT

A rubber composition used for a weather strip glass run channel of a vehicle includes a base polymer, a reinforcing agent, a moisture absorbent, a vulcanizing and curing agent, a vulcanization accelerator, and a vulcanization activator. The base polymer contains an ethylene propylene diene (EPDM) terpolymer in 80 to 90% by weight based on a weight of the base polymer and a silicone-acrylic ester graft copolymer in 10 to 20% by weight based on the weight of the base polymer.

9 Claims, 1 Drawing Sheet

-- Related Art --

RUBBER COMPOSITION FOR WEATHER STRIP GLASS RUN CHANNEL

CROSS-REFERENCE TO RELATED APPLICATION

This application claims under 35 U.S.C. §119(a) the benefit of priority to Korean Patent Application No. 10-2014-0173923 filed on Dec. 5, 2014, the entire content of which is incorporated herein by reference.

TECHNICAL FIELD

The present disclosure relates to a rubber composition used for a weather strip glass run channel of a vehicle.

BACKGROUND

A weather strip glass run channel of a vehicle is installed on a rim of a door window to seal a vehicle interior from an external environment. The weather strip glass run channel not only blocks wind noise, water, dust, and the like but also supports the door window during up and down movement.

The vehicle interior is sealed from an external environment by contacting the glass run channel and window glass and maintaining an overall uniform contact surface pressure. However, due to the frequent up and down movement of the vehicle window, severe tearing, abrasion and the like occur at the contact portion of the glass run channel and the window glass.

In order to enhance durability of the glass run channel, a method of coating a urethane mixture solution at a contact portion with glass as shown in FIG. 1 has been used. The urethane mixture solution is spray coated during a continuous extrusion process of a glass run channel. Scattering in the coating thickness may occur a non-uniform spray because a coating spray nozzle may clog during the continuous extrusion process. Operation defects occur when raising and lowering a vehicle door window due to abrasion of the urethane coating on vehicle window glass and the glass run channel. A urethane coating surface may become worn out due to very high friction when raising and lowering the vehicle door window from sand, dust, and the like being introduced to the glass run channel. In addition, when the urethane mixture solution coating on the glass run channel has poor quality, the glass run channel may not function properly due to a high load placed on a power window regulator component.

In view of the above, various researches have been progressed in order to reinforce sealing property and durability of a weather strip sponge. For example, a weather strip material, in which ethylene propylene diene (EPDM) rubber is a main material, and carbon black, a silane-based compound, and a titanium-based compound are added thereto as a reinforcing agent to strengthen physical properties such as a door sealing property and compression resistance deformability, has been developed.

However, demand for new technologies capable of reinforcing the sealing property and durability of a weather strip glass run channel material is still present in the art.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present disclosure has been made in an effort to solve the above-described problems associated with prior art, and an aspect of the present inventive concept provides a rubber composition for a weather strip glass run channel having excellent durability.

Another aspect of the present inventive concept provides a method for manufacturing the rubber composition for a weather strip glass run channel.

According to an exemplary embodiment of the present inventive concept, a rubber composition for a weather strip glass run channel includes a base polymer, a reinforcing agent, a moisture absorbent, a vulcanizing and curing agent, a vulcanization accelerator, and a vulcanization activator. The base polymer contains an EPDM terpolymer in 80 to 90% by weight and a silicone-acrylic ester graft copolymer in 10 to 20% by weight.

According to another exemplary embodiment of the present inventive concept, a method for manufacturing a rubber composition for a weather strip glass run channel includes preparing a carbon master batch (CMB) rubber by mixing an EPDM terpolymer and a reinforcing agent. A silicone-acrylic ester graft copolymer is mixed into the CMB composition and aged for 20-30 hours. A final master batch (FMB) composition is prepared by adding and mixing a vulcanizing and curing agent, a vulcanization accelerator, and a vulcanization activator to the aged composition.

Other aspects and exemplary embodiments of the inventive concept are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure.

Figure 1:
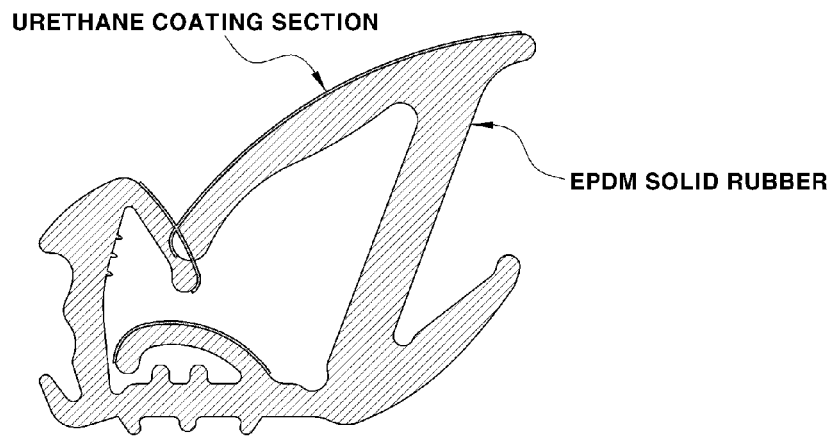
FIG. 1 is a cross-sectional diagram of a weather strip glass run channel according to a related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present inventive concept, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents, and other embodiments, which may be included within the spirit and scope of the invention as defined by the appended claims.

Figure 2:
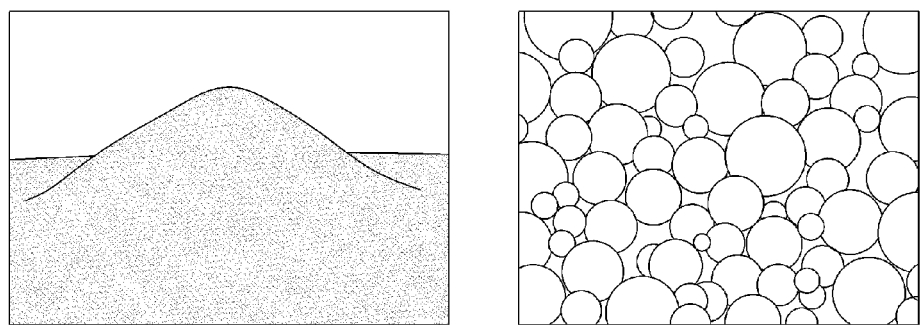
FIG. 2 depicts a micrograph silicone-acrylic ester graft copolymer.

A rubber composition for a weather strip glass run channel according to the present disclosure includes a mixture of an ethylene propylene diene (EPDM) terpolymer and a silicone-acrylic ester graft copolymer (see FIG. 2) as a base polymer.

An existing rubber composition for a weather strip glass run channel includes EPDM alone as a base polymer, which causes significantly low abrasivity when raising and lowering vehicle window glass. Further the existing rubber composition requires coating with a urethane mixing solution in order for reinforcing.

According to the present disclosure, a mixture of an EPDM terpolymer and a silicone-acrylic ester graft copolymer is used as a base polymer, and therefore, an affinity of an acrylic material and a low frictional resistance property of a silicone material can be provided. As a result, a rubber composition for a weather strip glass run channel of the present disclosure has relatively low frictional slide resistance when raising and lowering a vehicle door window. That is, the rubber composition for the weather strip glass run channel according to the present disclosure maintains product properties in exhibiting functions even without coating contact regions of glass with a urethane mixture solution. Further, defect rates can be decreased, and a working environment can be improved by eliminating a coating process of the urethane mixture solution.

The rubber composition for the weather strip glass run channel according to the present disclosure includes the base polymer, a carbon black reinforcing agent, a calcium oxide moisture absorbent, a vulcanizing and curing agent, a vulcanization accelerator, a vulcanization activator, and optional common additives.

Hereinafter, each component forming the rubber composition for the weather strip glass run channel according to the present disclosure will be described in detail.

1) Base Polymer

The rubber composition for the weather strip glass run channel of the present disclosure uses a mixture of the EPDM terpolymer and a silicone-acrylic ester graft copolymer as a base polymer.

The weather strip glass run channel requires excellent weather ability, and therefore, the EPDM terpolymer having excellent weatherability is used. Further, the EPDM terpolymer having high viscosity (high molecular) and high ethylene content may be used to maintain the form during an extrusion process of the weather strip glass run channel and to improve physical properties and the like.

The EPDM terpolymer having an ethylene content of 70% by weight or greater based on the terpolymer weight, or an ethylene content of 73 to 75% by weight, and Mooney viscosity ($ML_{1+8}$, 125° C.) of 70 or greater or Mooney viscosity of 70 to 90 may be used. When the ethylene content is too small or the Mooney viscosity is too low in the EPDM terpolymer, the physical properties of the weather strip glass run channel decrease, or the overall form thereof may not be maintained during the extrusion process. When the Mooney viscosity is too high, mixing processibility may be low due to a high molecular weight. Accordingly, using a specific EPDM terpolymer satisfying the characteristics described above is important in achieving target effects of the present disclosure.

In the present disclosure, a mixture of a silicone-acrylic ester graft copolymer with the EPDM terpolymer is used as the base polymer. The silicone-acrylic ester graft copolymer is a spherical particle having an average diameter of 15 to 45 μm as a white powder. The silicone-acrylic ester graft copolymer having a silicone content of 70% by weight or greater or more specifically a silicone content of 70 to 75% by weight therein, are used. When the silicone content is too small, frictional resistance is low. When the silicone content is too high, an acrylic component having low compatibility with EPDM decreases, and thus, the EPDM component may not mix well. In the examples of the present disclosure, Chaline R-170S, a product of Nissin Chemical Industry is used as the silicone-acrylic ester graft copolymer.

The rubber composition of the present disclosure uses a mixture having the EPDM terpolymer in 80 to 90% by weight and the silicone-acrylic ester graft copolymer in 10 to 20% by weight as the base polymer. When the content of the silicone-acrylic ester graft copolymer is less than 10% by weight, slip property may decrease on a surface of the weather strip glass run channel. When the silicone-acrylic ester graft copolymer is excessively used in greater than 20% by weight, the slip property significantly increases, thus deteriorating mixing workability.

2) Carbon Black

The present disclosure includes carbon black as a rubber reinforcing agent in order to improve a reinforcing property of the base polymer.

Fast extruding furnace carbon black having an average diameter range of 40 to 48 nm is used as the carbon black considering an extrusion property and mixing workability. When the average diameter of the carbon black is small, that is, less than 40 nm, product abrasion resistance is significantly improved. However, dispersion defects and difficulties in the work process may occur due to heat buildup generated in the mixing process. When the average diameter of the carbon black is greater than 48 nm, mixing workability may be improved, however, rubber abrasivity may decline. However, in the present disclosure, a product having a small particle diameter may be used depending on mixing facility, which may increase abrasion resistance.

The carbon black is used in a range of 40 to 60 parts by weight based on 100 parts by weight of the base polymer. When the content of the carbon black is less than 40 parts by weight, target mechanical properties of a rubber composition are not accomplished, and when greater than 60 parts by weight, flexibility of rubber may be reduced.

3) Calcium Oxide (CaO)

The present disclosure includes calcium oxide (CaO) as a moisture absorbent according to properties of a continuous extrusion vulcanization type manufacturing process.

The calcium oxide may be introduced in any process of a carbon master batch (CMB) composition or final master batch (FMB) composition manufacturing process, and liquid moisture reacts with a solid moisture absorbent inside rubber to produce a solid material named calcium hydroxide.

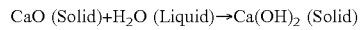

Accordingly, the moisture absorbent prevents inside porosity generated by the moisture included inside rubber being evaporated in a high temperature continuous vulcanization process.

Based on 100 parts by weight of the base polymer, the calcium oxide is used in a range of 1 to 10 parts by weight based on the whole rubber composition. When the content of the calcium oxide is less than 1 parts by weight, the phenomenon of inside porosity generation is not sufficiently prevented, and when used in greater than 10 parts by weight, dispersion defects and physical property decline may occur.

4) Vulcanizing and Curing Agent

As a vulcanizing and curing agent used in the present disclosure, sulfur (S) is used, and the vulcanizing and curing agent connects rubber polymers on a chain to have a 3-dimensional network structure.

The vulcanizing and curing agent is used in a range of 0.5 to 5 parts by weight based on 100 parts by weight of the base polymer. When the vulcanizing and curing agent is used in less than 0.5 parts by weight, hardness and mechanical properties decrease since partial non-crosslinking increases. When the vulcanizing and curing agent is used in greater than 5 parts by weight, excessive crosslinking occurs thus increasing processing difficulties and hardness and deteriorating flexibility during the manufacturing process.

5) Vulcanization Accelerator

In the present disclosure, a vulcanization accelerator is used in order to shorten crosslinking time of the vulcanizing and curing agent. Examples of the vulcanization accelerator include one or more selected from among zinc dibutyl dithiocarbamate (ZnBDC), 2-mercaptobenzothiazole (MBT), ethylene thiuram (ETU), 4,4'-dithiodimorpholine (DTDM), mercaptobenzothiazole disulfide (MBTS), tetramethyl thiuram disulfate (TMTD), and the like.

The vulcanization accelerator is used in a range of 1 to 5 parts by weight based on 100 parts by weight of the base polymer. When the vulcanization accelerator is used in less than 1 parts by weight, crosslinking time may not be shortened. When the vulcanization accelerator is used in greater than 5 parts by weight, excessive crosslinking occurs thus causing increasing processing difficulties and hardness and deteriorating flexibility during the manufacturing process.

6) Vulcanization Activator

The present disclosure includes a vulcanization activator to further accelerate a reaction by activating the vulcanization accelerator. The selection of the vulcanization activator is not limited in the present disclosure, and one or more selected from among zinc oxide (ZnO), stearic acid, and mixtures thereof may be used as the vulcanization activator.

The vulcanization activator is used in a range of 5 to 10 parts by weight based on 100 parts by weight of the base polymer. When the vulcanization activator is used in less than 5 parts by weight, an activation effect of the vulcanization accelerator is insignificant due to a small amount of the vulcanization activator used. When the vulcanization activator is used in greater than 10 parts by weight, blooming may occur.

7) Additive

The rubber composition of the present disclosure may include common additives. Examples thereof may include process oil, a flow improver, and the like.

The process oil is used for facilitating the process, and may be individually added before adding or while mixing each component. For the process oil, paraffin-based oil commonly used in the art is used, and specifically, aromatic naphthenic-based oil, aliphatic paraffin-based oil, paraffin-based/ naphthenic-based oil, or the like may be used. The process oil may be used in a range of 20 to 40 parts by weight based on 100 parts by weight of the polymer.

The flow improver may be used for improving the flowability of the rubber composition. As the flow improver, those commonly used in the art may be used, and selection thereof is not limited. In the example of the present disclosure, a WB-16 product (a mixture of calcium soap and saturated fatty acid amide) manufactured by Struktol Company of America, and a PEG400 product (polyethylene glycol) manufactured by Dongnam Co., Ltd. are used. The flow improver may be used in a range of 1 to 10 parts by weight with respect to 100 parts by weight of the polymer.

In addition, the present disclosure provides a method for manufacturing the rubber composition for the weather strip glass run channel described above.

The method for manufacturing the rubber composition according to the present disclosure includes preparing CMB rubber by mixing an EPDM terpolymer, a reinforcing agent, a moisture absorbent, and optional common additives. A silicone-acrylic ester graft copolymer is mixed to the CMB rubber composition. A FMB composition is prepared by adding and mixing a vulcanizing and curing agent, a vulcanization accelerator, and a vulcanization activator to the composition mixed in the mixture of the silicone-acrylic ester graft copolymer and the CMB rubber composition.

In the manufacturing method according to the present disclosure, the EPDM terpolymer, the reinforcing agent, the moisture absorbent, and the common additives are mixed first, and the mixture is aged (primary) for 20 to 30 hours to prepare the CMB rubber composition. Herein, when the CMB rubber composition is not sufficiently aged, a silicone-acrylic ester graft copolymer, which is added thereafter, may not be readily dispersed.

Next, the silicone-acrylic ester graft copolymer is introduced to the CMB rubber composition, and then the mixture is again aged for 20 to 30 hours. Herein, the mixture is secondary aged so that the EPDM terpolymer, the silicone-acrylic ester graft copolymer, and the additives are uniformly dispersed.

The vulcanizing and curing agent, the vulcanization accelerator, and the vulcanization activator are introduced to the reaction mixture, and then mixed to manufacture a target rubber composition for the weather strip glass run channel of the present disclosure.

EXAMPLES

The present disclosure, which has been described above, will be described in more detail with reference to the following examples, however, the present disclosure is not limited thereto.

Example

Example 1 and Comparative Examples 1 and 2:
Manufacture of Rubber Composition for Weather Strip Glass Run Channel A rubber composition for a weather strip glass run channel was manufactured by mixing components in the following Table 1 in a composition ratio shown in the following Table 1.

In other words, after an EPDM terpolymer, PEG400, and WB-16 were introduced and masticated in an internal mixer, carbon black (FEF), paraffin-based process oil, and calcium oxide (CaO) were introduced thereto, and the mixture was mixed and aged for 24 hours. A silicone-acrylic ester graft copolymer was introduced to the primarily aged mixture, the result was secondarily mixed, and then aged again for 24 hours. A vulcanizing and curing agent, a vulcanization accelerator, and a vulcanization activator were introduced and mixed to the secondarily aged mixture, and a rubber composition for a weather strip glass run channel was manufactured.

[Used Components]

(1) EPDM

① KEP 5770: a product of Kumho Polychem, an ethylene content 75.6% by weight, an ENB content 5.3% by weight, Mooney viscosity ($ML_{1+8}$, 125° C.) 75

② KEP 510: a product of Kumho Polychem, an ethylene content 71% by weight, an ENB content 5.7% by weight, Mooney viscosity ($ML_{1+8}$, 125° C.) 23

(2) Chaline R-170S: a silicone-acrylic ester graft copolymer, a product of Nissin Chemical Industry, a silicone content 70% by weight, spherical particles having an average diameter of 30 μm (3) Carbon black: a product of Orion Engineered Carbons, Corax N500, fast extruding furnace carbon black, an average diameter of 40 to 48 nm (4) Vulcanization accelerator:

① ZnBDC: zinc dibutyl dithiocarbamate
② MBT: 2-mercaptobenzothiazole
③ ETU: ethylene thiuram
④ DTDM: 4,4'-dithiodimorpholine
⑤ MBTS: mercaptobenzothiazole disulfide (5) Flow improver:

① PEG#4000: a product of Dongnam Co., Ltd.,
② WB-16: a product of Struktol Company of America, a mixture of calcium soap, and saturated fatty acid amide

TABLE 1

| Category | | | Rubber Composition (g) | | |
|---|---|---|---|---|---|
| | | | Example 1 | Comparative Example 1 | Comparative Example 2 |
| EPDM | KEP 5770 | | 83 | | 100 |
| | KEP 510 | | 83 | | |
| | Chaline R-170S | | 17 | 17 | — |
| | Carbon Black FEF | | 58.3 | 58.3 | 58.3 |
| | Moisture Absorbent CaO | | 4.0 | 4.0 | 4.0 |
| | Vulcanizing and Curing Agent, S | | 1.46 | 1.46 | 1.46 |
| Vulcanization Accelerator | ① ZnBD | | 0.63 | 0.63 | 0.63 |
| | ② MBT | | 0.42 | 0.42 | 0.42 |
| | ③ ETU | | 0.42 | 0.42 | 0.42 |
| | ④ DTDM | | 0.42 | 0.42 | 0.42 |
| | ⑤ MBTS | | 0.42 | 0.42 | 0.42 |
| Vulcanization Activator | ZnO | | 6.4 | 6.4 | 6.4 |
| | Stearic Acid | | 1.28 | 1.28 | 1.28 |
| | Paraffin Oil | | 30.4 | 30.4 | 30.4 |
| Flow Improver | PEG#4000 | | 2.12 | 2.12 | 2.12 |
| | WB-16 | | 1.67 | 1.67 | 1.67 |
| | Calcium Carbonate | | 25.0 | 25.0 | 25.0 |

[Test Example]

For the rubber composition manufactured in Example 1 and Comparative Examples 1 and 2, the following physical properties were evaluated, and the results are shown in the following Table 2.

In the following Table 2, aged properties show differences in the measurement values between the basic property values measured at room temperature (approximately 20° C.) and the values measured at 70° C.×70 hr under an aging condition.

TABLE 2

| Category | | Measurement Method | Example 1 | Comparative Example 1 | Comparative Example 2 |
|---|---|---|---|---|---|
| Basic Properties | Shore Hardness | KS M 6518 | 72 | 71 | 72 |
| | Tensile Strength (kg/cm²) | | 134.6 | 115.5 | 176.3 |
| | Percent Elongation (%) | | 387.6 | 290.5 | 378.6 |
| | Modulus (M100, kg/cm²) | | 33.8 | 35.4 | 43.68 |
| Aged Properties (Change Rate) | Shore Hardness | KS M 6518 70° C. × 70 hr | 0 | 0 | 0 |
| | Tensile Strength (%) | | +5.4 | +4.5 | +8.2 |
| | Percent Elongation (%) | | −4.1 | −4.9 | −1.5 |
| Compression Permanent Percentage of Contraction (%) | | JIS K 6301 70° C. × 22 hr | 11.0 | 13.8 | 9.8 |
| Ozone Resistance | | JIS K 6301 50 ± 5 pphm × 40° C. × 20% × 200 hr | No Crack Occurrence | No Crack Occurrence | No Crack Occurrence |
| NBS | Abrasion Resistance (Times) | KS M 6625 | 132 | 100 | 120 |
| Dynamic Friction Coefficient | | | 2.16 | 3.08 | 3.46 |

According to Table 2, the composition of Comparative Example 1 used an EPDM terpolymer having a low viscosity, and it was identified that basic properties, abrasion resistance, and a dynamic friction coefficient were significantly low compared to Example 1. In addition, the composition of Comparative Example 2 does not include the silicone-acrylic ester graft copolymer, and it was identified that abrasion resistance and a dynamic friction coefficient, which may affect product properties, were significantly low compared to Example 1 although tensile strength was excellent.

The present disclosure has an advantage in that a urethane mixture solution is not necessarily coated on a product surface due to low frictional slide resistance when raising and lowering a vehicle window, and product properties can be maintained by using as a rubber mixing composition.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A rubber composition for a weather strip glass run channel, the rubber composition comprising:
   a base polymer; a reinforcing agent; a moisture absorbent; a vulcanizing and curing agent; a vulcanization accelerator; and a vulcanization activator,
   wherein the base polymer contains an ethylene propylene diene (EPDM) terpolymer in 80 to 90% by weight based on a weight of the base polymer and a silicone-acrylic ester graft copolymer in 10 to 20% by weight based on the weight of the base polymer.

2. The rubber composition of claim 1, wherein the EPDM terpolymer has an ethylene content of 70% by weight or greater and a Mooney viscosity ($ML_{1+8}$, 125° C.) of 70 or greater.

3. The rubber composition of claim 1, wherein the silicone-acrylic ester graft copolymer has a silicone content of 70% by weight or greater and is a spherical particle having an average particle size of 15 to 45 µm.

4. The rubber composition of claim 1, wherein the reinforcing agent is fast extruding furnace carbon black having an average diameter range of 40 to 48 nm.

5. The rubber composition of claim 1, wherein the moisture absorbent is calcium oxide (CaO).

6. The rubber composition of claim 1, wherein the vulcanization accelerator is at least one selected from the group consisting of zinc dibutyl dithiocarbamate (ZnBDC), 2-mercaptobenzothiazole (MBT), ethylene thiuram (ETU), 4,4'-dithiodimorpholine (DTDM), mercaptobenzothiazole disulfide (MBTS), and tetramethyl thiuram disulfate (TMTD).

7. The rubber composition of claim 1, wherein the vulcanization activator is at least one selected from the group consisting of zinc oxide (ZnO), stearic acid, and a mixture thereof.

8. The rubber composition of claim 1, further comprising at least one additive selected from the group consisting of aromatic naphthenic-based oil, aliphatic paraffin-based oil, and paraffin-based/ naphthenic-based oil.

9. A method for manufacturing a rubber composition for a weather strip glass run channel, the method comprising steps of:
   a) preparing carbon master batch (CMB) rubber by mixing an EPDM terpolymer, a reinforcing agent, and a moisture absorbent, and aging the mixture for 20 to 30 hours;
   b) adding and mixing a silicone-acrylic ester graft copolymer to the CMB composition, and aging the mixture for 20 to 30 hours; and
   c) preparing a final master batch (FMB) composition by adding and mixing a vulcanizing and curing agent, a vulcanization accelerator, and a vulcanization activator to the composition aged in the b) step.

* * * * *